(12) United States Patent
Sakaguchi et al.

(10) Patent No.: US 10,303,175 B2
(45) Date of Patent: May 28, 2019

(54) WORK VEHICLE MANAGEMENT SYSTEM AND WORK VEHICLE MANAGEMENT METHOD

(71) Applicant: Kubota Corporation, Osaka-shi (JP)

(72) Inventors: Kazuo Sakaguchi, Amagasaki (JP); Izuru Shimamoto, Amagasaki (JP); Kenji Tamatani, Amagasaki (JP); Megumi Suzukawa, Amagasaki (JP); Atsushi Shinkai, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 158 days.

(21) Appl. No.: 15/620,839

(22) Filed: Jun. 13, 2017

(65) Prior Publication Data

US 2018/0210449 A1 Jul. 26, 2018

(30) Foreign Application Priority Data

Jan. 20, 2017 (JP) .................................. 2017-008355

(51) Int. Cl.
| | |
|---|---|
| *G05D 1/00* | (2006.01) |
| *G05D 1/02* | (2006.01) |
| *A01B 69/04* | (2006.01) |
| *G01S 19/42* | (2010.01) |
| *G01S 19/49* | (2010.01) |

(52) U.S. Cl.
CPC ......... *G05D 1/0219* (2013.01); *A01B 69/008* (2013.01); *G01S 19/42* (2013.01); *G01S 19/49* (2013.01); *G05D 1/0061* (2013.01); *G05D 1/0278* (2013.01); *G05D 2201/0201* (2013.01)

(58) Field of Classification Search
CPC .. G05D 1/0219; G05D 1/0061; G05D 1/0278; G05D 2201/0201; G01S 19/49; G01S 19/42; A01B 69/008
See application file for complete search history.

(56) References Cited

U.S. PATENT DOCUMENTS

| | | | | |
|---|---|---|---|---|
| 4,919,224 A | * | 4/1990 | Shyu .................... | A01D 34/008 180/168 |
| 5,925,080 A | * | 7/1999 | Shimbara ............. | G05D 1/0244 180/168 |
| 6,687,616 B1 | * | 2/2004 | Peterson .............. | A01B 79/005 702/5 |

(Continued)

FOREIGN PATENT DOCUMENTS

JP 09-154315 6/1997

*Primary Examiner* — Russell Frejd
(74) *Attorney, Agent, or Firm* — Mori & Ward, LLP

(57) ABSTRACT

A work vehicle management system includes a memory, first circuitry, second circuitry, third circuitry, and fourth circuitry. The memory is to store at least one halt record with respect to a halt status at a timing when a work vehicle is halted while traveling along a travel route in a work field. The first circuitry is configured to record the at least one halt record in the memory. The second circuitry is configured to extract the at least one halt record from the memory to display in a display the at least one halt record from which a resuming basis record is to be selected. The third circuitry is configured to generate resuming information based on the resuming basis record. The fourth circuitry is configured to control the work vehicle based on the resuming information to resume from the halt status.

12 Claims, 5 Drawing Sheets

(56) References Cited

U.S. PATENT DOCUMENTS

| | | | |
|---|---|---|---|
| 10,156,848 B1 * | 12/2018 | Konrardy | G05D 1/0088 |
| 2012/0316722 A1 * | 12/2012 | Zeitler | G05D 1/0261 |
| | | | 701/23 |
| 2014/0121882 A1 * | 5/2014 | Gilmore | G05D 1/0295 |
| | | | 701/25 |
| 2018/0181143 A1 * | 6/2018 | Hiramatsu | A01B 69/008 |
| 2018/0215393 A1 * | 8/2018 | Miyakubo | G05D 1/0278 |

\* cited by examiner

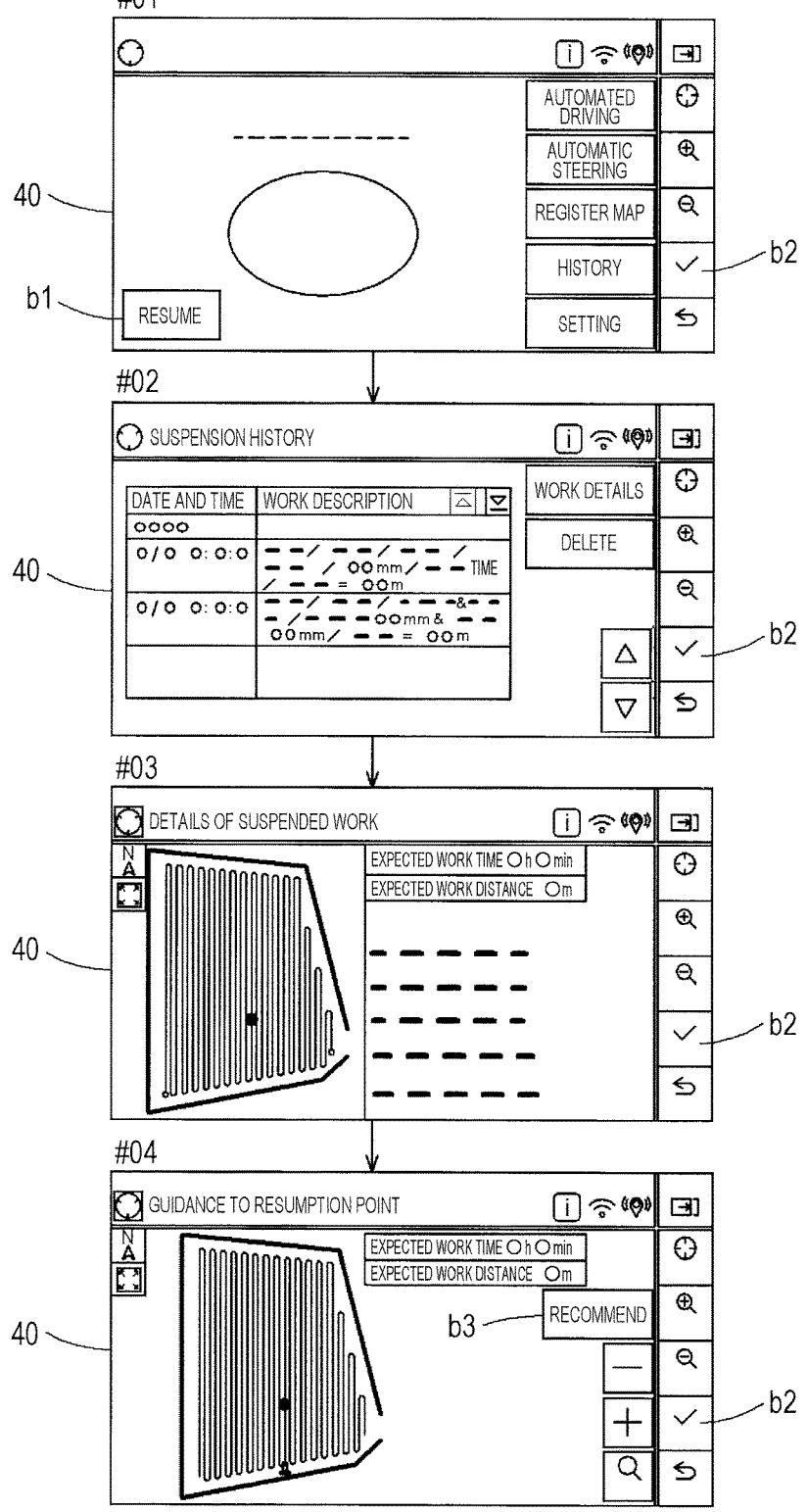

WORK VEHICLE MANAGEMENT SYSTEM AND WORK VEHICLE MANAGEMENT METHOD

CROSS-REFERENCE TO RELATED APPLICATIONS

The present application claims priority under 35 U. S. C. § 119 to Japanese Patent Application No. 2017-008355, filed Jan. 20, 2017. The contents of this application are incorporated herein by reference in their entirety.

BACKGROUND OF THE INVENTION

Field of the Invention

The present invention relates to a work vehicle management system and a work vehicle management method.

Discussion of the Background

In a work vehicle that automatically travels along a travel route in a work field, upon occurrence, in the middle of work travel, of a vehicle reason including running out of fuel and a work reason including limitation of work volume (crop accommodation limitation, replenishment of work field supply), the work travel is suspended temporarily. Then, after moving to a specified place in order to solve such a reason, the work vehicle returns to a position again where the work travel has been suspended, and the work travel is resumed.

During work of planting seedlings, in response to a movement instruction to an auxiliary work position (seedling supply position), a work vehicle according to Unexamined Japanese Patent Publication No. H09-154315 moves to the auxiliary work position from a current work position at which the work vehicle is currently positioned. When the seedling supply is completed, the work vehicle moves from the auxiliary work position to the current work position in response to a return instruction to the current work position. In a control system of this work vehicle, information on the auxiliary work position of the work vehicle in the work field has been stored in advance, a vehicle body position in the work travel within the work field is detected, on the basis of the stored information on the auxiliary work position and information on the detected vehicle body position, when the movement instruction to the auxiliary work position is provided, the work vehicle is moved from the current work position at which the work vehicle is currently positioned to the auxiliary work position. When the return instruction to the current work position is provided, the work vehicle is moved from the auxiliary work position to the current work position. At that time, the movement instruction to the auxiliary work position during the work travel is instructed by a manual operation to a manual movement instruction switch. The return instruction from the auxiliary work position to the current work position is instructed by a manual operation to a return instruction switch as a manual return instruction method.

SUMMARY OF THE INVENTION

According to one aspect of the present invention, a work vehicle management system includes a memory, first circuitry, second circuitry, third circuitry, and fourth circuitry. The memory is to store at least one halt record with respect to a halt status at a timing when a work vehicle is halted while traveling along a travel route in a work field. The first circuitry is configured to record the at least one halt record in the memory. The second circuitry is configured to extract the at least one halt record from the memory to display in a display the at least one halt record from which a resuming basis record is to be selected. The third circuitry is configured to generate resuming information based on the resuming basis record. The fourth circuitry is configured to control the work vehicle based on the resuming information to resume from the halt status.

According to another aspect of the present invention, a work vehicle management method includes recording in a memory at least one halt with respect to a halt status at a timing when a work vehicle is halted while traveling along a travel route in a work field. The at least one halt record is extracted from the memory to display in a display the at least one halt record from which a resuming basis record is to be selected. Resuming information is generated based on the resuming basis record. The work vehicle is controlled based on the resuming information to resume from the halt status.

According to further aspect of the present invention, a work vehicle management system includes a memory, recording means, extracting means, generating means, and controlling means. The memory is to store at least one halt record with respect to a halt status at a timing when a work vehicle is halted while traveling along a travel route in a work field. The recording means are for recording the at least one halt record in the memory. The extracting means are for extracting the at least one halt record from the memory to display in a display the at least one suspension record from which a resuming basis record is to be selected. The generating means are for generating resuming information based on the resuming basis record. The controlling means are for controlling the work vehicle based on the resuming information to resume from the halt status.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a screen transition view illustrating transition of a screen displayed by a display unit of a touch panel 40 when the suspended work travel is resumed.

DESCRIPTION OF THE EMBODIMENTS

Figure 1:
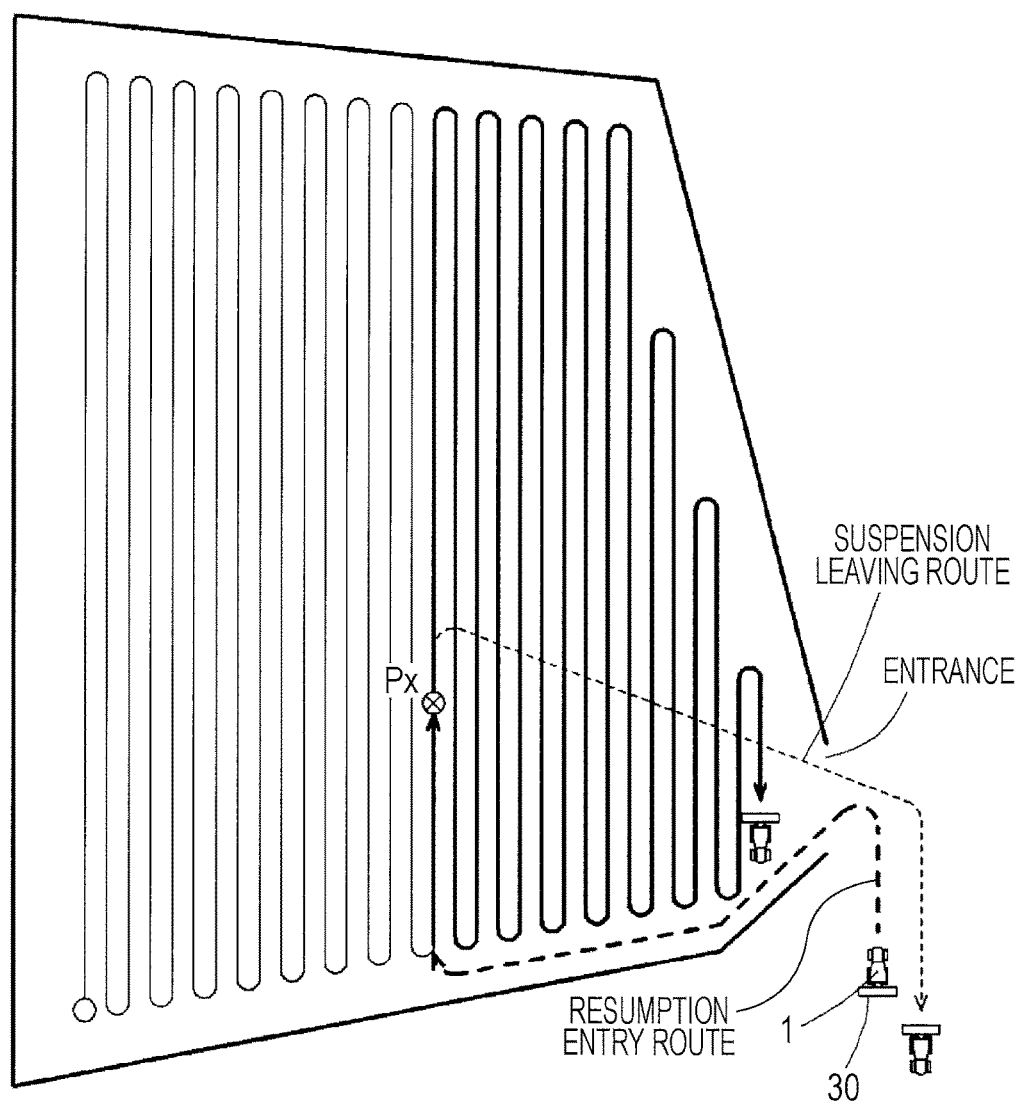
FIG. 1 is an illustrative view illustrating an exemplary embodiment of work travel including suspension and resumption of the work travel in one field.

The embodiments will now be described with reference to the accompanying drawings, wherein like reference numerals designate corresponding or identical elements throughout the various drawings. In the following embodiments, the phrase "work travel" used includes working while traveling, only traveling, only working, a state where at least one of working while traveling, only traveling, and only working is performed, and a state where such work travel is temporarily stopped.

A work travel management system according to one exemplary embodiment of the present invention that manages suspension and resumption of work travel performed by a work vehicle will be described with reference to the drawings. In this exemplary embodiment, as illustrated in FIG. 1, the work vehicle is a tractor capable of automatically traveling with a vehicle body 1 equipped with a work device 30. The work vehicle performs work travel along a travel route set in a field as a work field. Here, the travel route includes a long straight line route section extending in parallel, and a U-turn route section that connects adjacent ends of the straight line route section. In FIG. 1, the tractor performs work travel in about half of the field by automatic travel, and then suspends the work travel at point Px and leaves the field. The tractor that has left the field goes to another field or the like by manual travel, performs work travel or the like there, and subsequently returns to the field where the work travel has been suspended, and resumes the work travel. At that time, the tractor preferably resumes the work travel from an end on an already worked side of the straight line route section including point Px, instead of resuming the work travel from point Px. This is because a target travel route for automatic travel can be detected more easily and securely at the end of the straight line route section than in the middle of the straight line route section. In FIG. 1, a thin line represents the travel route along which the original work travel has been performed, whereas a thick line represents the travel route after the work is resumed.

Figure 2:
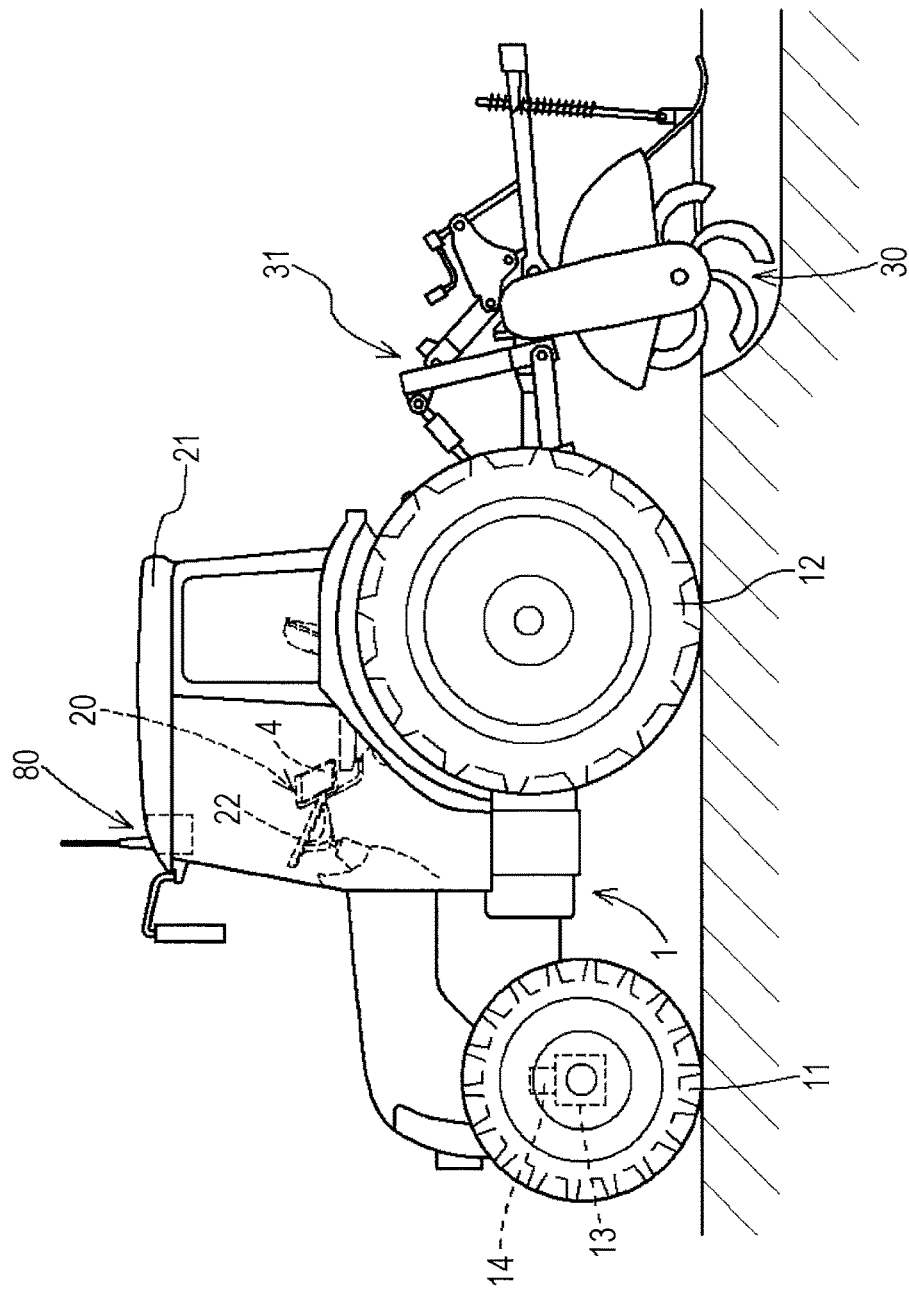
FIG. 2 is a side view of a tractor, which is one example of a work vehicle.

As illustrated in FIG. 2, this tractor is provided with a cab 20 in a central portion of the vehicle body 1 supported by front wheels 11 and rear wheels 12. The tractor is equipped with the work device 30, which is a rotary tilling machine, via a hydraulic lifting mechanism 31 at a rear of the vehicle body 1. The front wheels 11 function as steering control wheels through which the tractor changes a travel direction when a steering angle of the steering control wheels is changed. The steering angle of the front wheels 11 is changed by an operation of a steering mechanism 13. The steering mechanism 13 includes a steering motor 14 for automatic steering. For manual traveling, the front wheels 11 can be steered by operating a steering wheel 22 disposed in the cab 20. The cab 20 is equipped with a general purpose terminal 4 that provides a user with information and receives instructions from the user. In a cabin 21 of the tractor, a satellite positioning module 80 is provided. As a component of the satellite positioning module 80, a satellite antenna for receiving a global navigation satellite system (GNSS) signal (including a GPS signal) is attached at a ceiling area of the cabin 21. Note that the satellite positioning module 80 may be combined with an inertial navigation module incorporated with a gyro acceleration sensor and a magnetic director sensor for complementing satellite navigation. Such an inertial navigation module may be provided in a different location from the location of the satellite positioning module 80.

Figure 3:
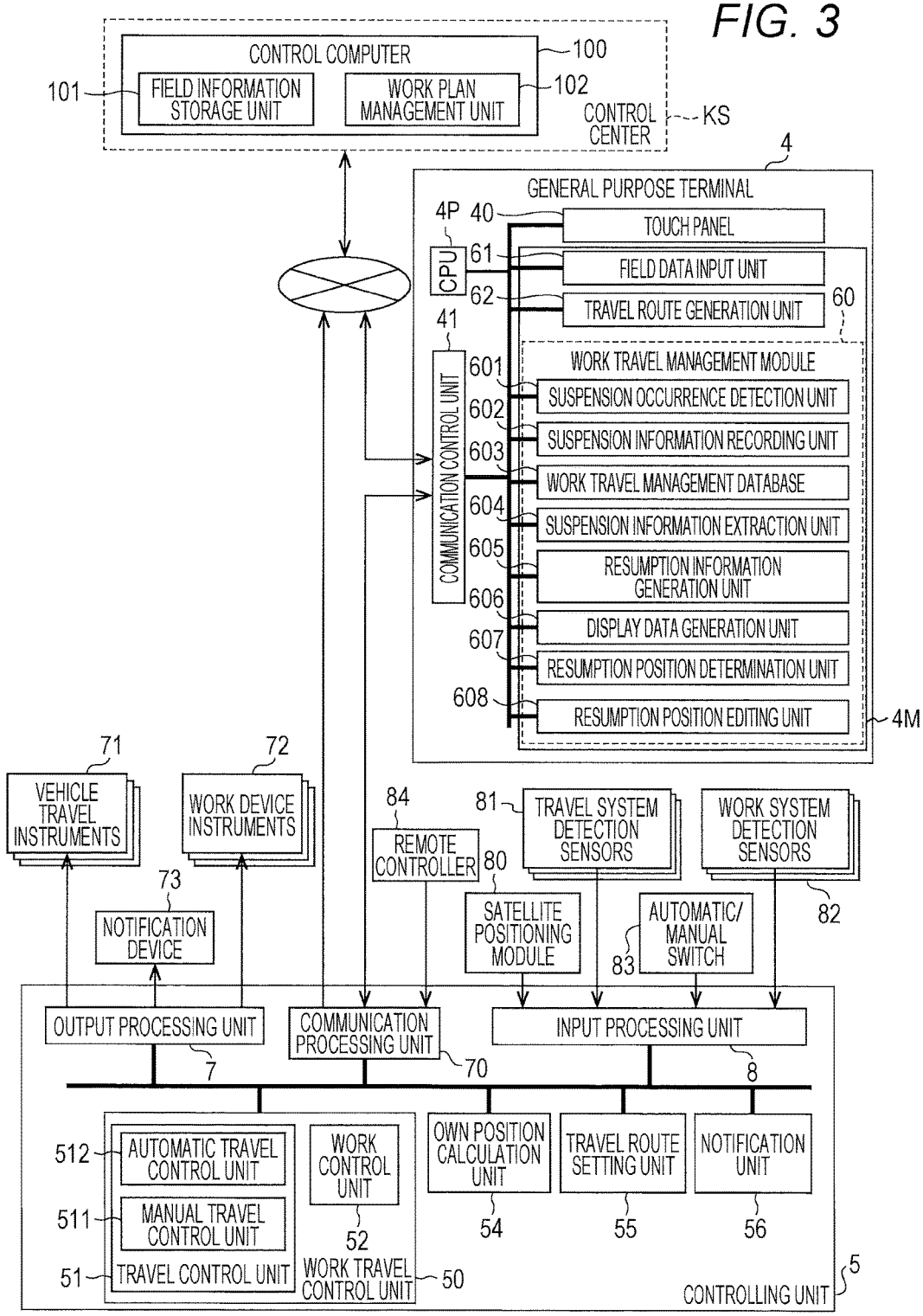
FIG. 3 is a functional block diagram of a control system of the tractor including a control function unit that functions as a work travel management system.

FIG. 3 illustrates a control system configured in this tractor. The control system of this exemplary embodiment includes a first control unit, which is the general purpose terminal 4 including a graphical user interface, a controlling unit 5 that controls the vehicle body 1 and the work device 30 of the tractor, and a remote controller 84 for wirelessly controlling travel start and travel stop of the tractor from outside during automatic travel. Many functions of the work travel management system according to the embodiment of the present invention are substantially modularized as a work travel management module 60 and are incorporated into the general purpose terminal 4.

In addition to the work travel management module 60, the general purpose terminal 4 includes a field data input unit 61 and a travel route generation unit 62 that generates the travel route for automatic travel. Specifically, the general-purpose terminal 4 includes a central processing unit (CPU) 4P (first circuitry, second circuitry, third circuitry, fourth circuitry, and fifth circuitry 4P) and a memory 4M. Programs of each unit of the work travel management module 60, the field data input unit 61, and the travel route generation unit 62 are stored in the memory 4M and executed by the CPU 4P to perform functions of each unit of the work travel management module 60, the field data input unit 61, and the travel route generation unit 62, respectively. Furthermore, the general purpose terminal 4 also includes functions of a general computer system, such as a touch panel 40 and a communication control unit 41. The general purpose terminal 4 is coupled to the controlling unit 5 in such a manner that the general purpose terminal 4 can exchange data by vehicle-mounted LAN, wireless communication, cable communication, or the like. Furthermore, the general purpose terminal 4 can exchange data with a control computer 100 configured in a remote control center KS via a wireless channel or the Internet. In addition, it is also possible to carry the general purpose terminal 4 out of the tractor for use when the general purpose terminal 4 is configured as a device such as a tablet computer and a cellular phone and is data-exchangably coupled to the control system of the tractor.

In this exemplary embodiment, field information including a position of the field on a map and arrangement of farm roads surrounding the field is stored in a field information storage unit 101 of the control computer 100, and this field information is needed for finding out the field to work. The control computer 100 also includes a work plan management unit 102 that manages a work plan describing the work in a specified field. The general purpose terminal 4 can access the control computer 100, and download the field information from the field information storage unit 101 and the work plan from the work plan management unit 102. Alternatively, the general purpose terminal 4 can also input the field information and the work plan via a recording medium such as a USB memory.

The travel route generation unit 62 receives, from the field data input unit 61, field external shape data indicating an external shape of the field to be worked, and then develops the received field external shape data in a working memory area. The travel route generation unit 62 generates the travel route for automatic travel in the field prescribed by this field external shape data. As functions for generating the travel route, a time route determination function, a reference straight line determination function, an inside route determination function, and the like are substantially implemented by starting a computer program. In this exemplary embodiment, the travel route generation unit 62 generates the travel route (also referred to as straight line reciprocating travel route) including a plurality of straight line route sections and a U-turn route section that connects ends of the straight line route sections.

A circling route determination function determines a circumferential travel route for performing circumferential travel in an outer region of the field. The outer region is also a region in which the tractor performs U-turn travel. A width of the outer region required for the U-turn travel of the tractor is calculated on the basis of a work width and an appropriate turning radius of the tractor. A turning count of the tractor is calculated. That is, the turning count is determined such that a value of an integral multiple (turning count) of the work width of the tractor (accurately, work width in consideration of an overlap width) exceeds the width of the outer region necessary for U-turn travel. The actual width of the outer region is determined on the basis of this determined turning count. In general tilling work, a region corresponding to the two to three-round circumferential travel route is set as the outer region. A region inside the outer region serves as a central region where the work travel of substantially straight movement is performed.

The reference straight line determination function determines a reference straight line that extends in parallel with a reference side of the field and fills a central region at predetermined intervals. This reference straight line serves as a base for the travel route in the central region. Determination of such a reference straight line is pre-processing for generating an inside travel route. At that time, a longest side of an approximate polygon created by an external shape of the field is generally employed as the reference side of the field. In the work field (field) as illustrated in FIG. 1, the external shape is an approximate quadrangle, and the longest side is selected as the reference side. A straight line that is parallel with this reference side and fills the central region in work width is set as the reference straight line. Then, the inside route determination function defines that the reference straight line in the central region is the straight line route section that is a straight movement route, and generates the continuous inside travel route by connecting the straight line route sections with the U-turn route.

The tractor passes through an entrance from a farm road, enters the field, and moves to a starting end of the inside travel route. By detection of the starting end of the inside travel route, work travel by automatic travel is started along the inside travel route. Since a final end of the inside travel route is connected to a starting end of the circumferential travel route, after the work travel along the inside travel route, transition is made to the circumferential travel route, and the work travel along the circumferential travel route is performed. When the automatic travel along the circumferential travel route is finished, the tractor leaves the field through the entrance. Travel of the tractor to pass through the entrance may be performed manually by the driver getting in the tractor, or may be performed with a remote controller or automatically.

As illustrated in FIG. 3, the controlling unit 5, which is a core element of the control system of the tractor, includes an output processing unit 7 and an input processing unit 8, which respectively function as input and output interfaces, and a communication processing unit 70. The output processing unit 7 is coupled to devices equipped in the tractor, such as vehicle travel instruments 71, work device instruments 72, and a notification device 73. The vehicle travel instruments 71 include the steering motor 14, and although not illustrated, devices to be controlled for allowing the vehicle to travel, such as a transmission mechanism and an engine unit. The work device instruments 72 include devices such as a drive mechanism for the work device 30 and the lifting mechanism 31 that raises and lowers the work device 30. The notification device 73 includes a display, lamps, and a speaker. The notification device 73 is used for notifying the driver or supervisor of attention information and warning information, such as travel precautions and deviation from the target travel route when the work vehicle is automatically steered. Note that it is also possible to perform such notification via the general purpose terminal 4. The communication processing unit 70 has a function of transmitting data processed by the controlling unit 5 to the control computer 100, and receiving various kinds of data from the control computer 100. Furthermore, the communication processing unit 70 inputs remote control instructions from the remote controller 84.

The input processing unit 8 is coupled to, for example, the satellite positioning module 80, travel system detection sensors 81, work system detection sensors 82, and an automatic/manual switch 83. The travel system detection sensors 81 include sensors for detecting travel states such as an engine speed and a transmission state. The work system detection sensors 82 include sensors for detecting a position and inclination of the work device 30, sensors for detecting workloads, and the like. The automatic/manual switch 83 is a switch for selecting either an automatic travel mode for traveling with automatic steering or a manual steering mode for traveling with manual steering.

Furthermore, the controlling unit 5 includes a work travel control unit 50, an own position calculation unit 54, a travel route setting unit 55, and a notification unit 56. Based on positioning data sent from the satellite positioning module 80, the own position calculation unit 54 calculates the own position. The calculated own position is also sent to the general purpose terminal 4.

The work travel control unit 50 includes a travel control unit 51 and a work control unit 52. Since the automatic travel (automatic steering) mode and the manual travel (manual steering) mode are both configured to be available in this tractor for traveling, the travel control unit 51 for controlling the vehicle travel instruments 71 includes a manual travel control unit 511 and an automatic travel control unit 512. In accordance with operations of the driver, the manual travel control unit 511 controls the vehicle travel instruments 71. The automatic travel control unit 512 calculates discrepancies in direction and position between the travel route that is set by the travel route setting unit 55 and the own position, and generates an automatic steering instruction. This automatic steering instruction is output to the steering motor 14 via the output processing unit 7. Furthermore, the automatic travel control unit 512 stops the tractor on the basis of a stop instruction from the remote controller 84, and causes the tractor to start travel on the basis of a starting instruction from the remote controller 84. To control movement of the work device 30, the work control unit 52 provides control signals to the work device instruments 72. The notification unit 56 generates notification signals (display data and voice data) for notifying information necessary for the driver or the supervisor, and provides the notification signals to the notification device 73 incorporated into an instruments panel.

The travel route setting unit 55 receives the manual travel route (travel route for manual travel) and automatic travel route (travel route for automatic travel) generated by the travel route generation unit 62 via the communication processing unit 70 from the general purpose terminal 4, and sets the manual travel route and the automatic travel route as target travel routes for the tractor.

Figure 4:
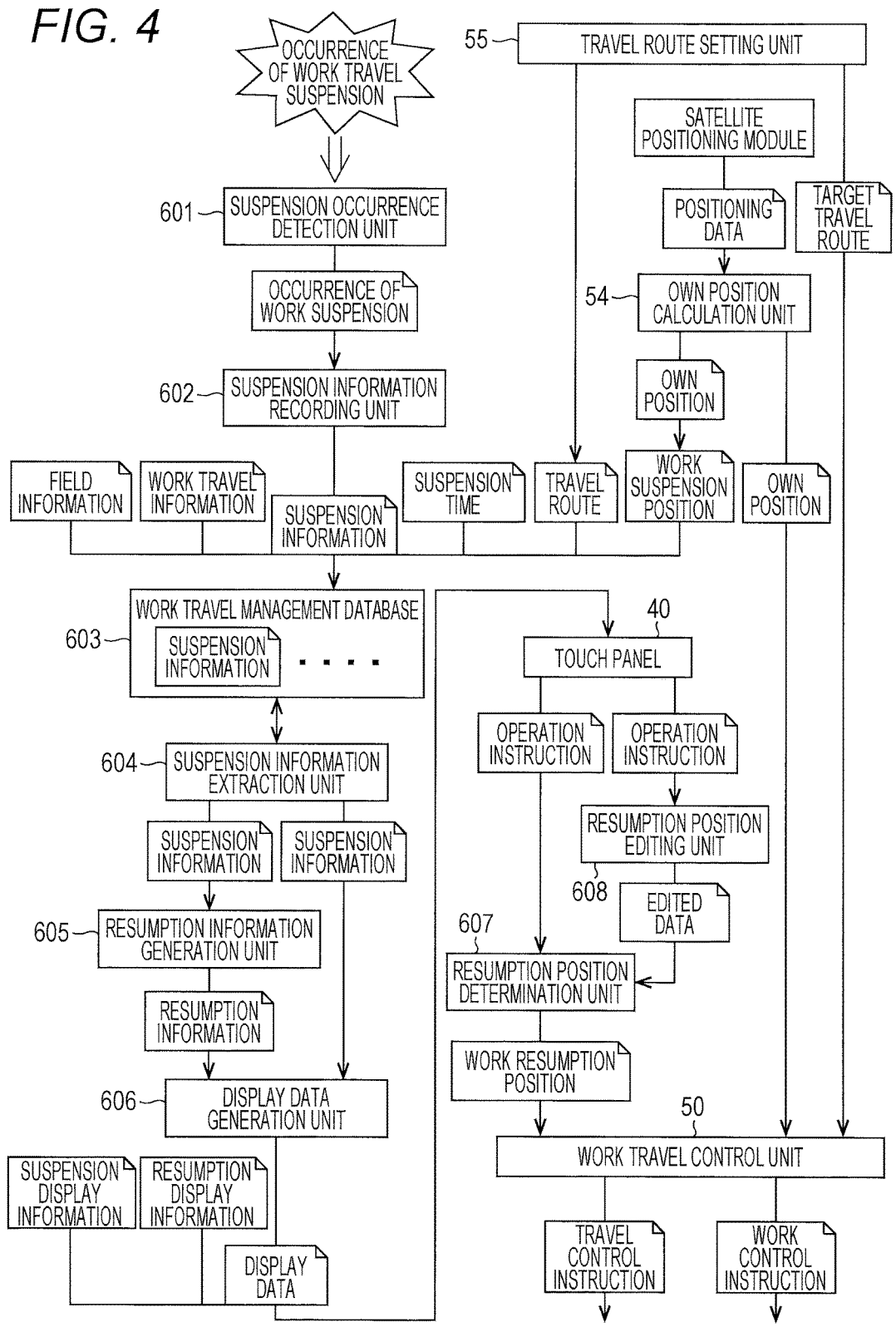
FIG. 4 is an illustrative diagram illustrating one example of a work travel flow including suspension and resumption of the work travel performed by the work travel management system.

The work travel management module 60 that manages the work travel of the tractor including suspension and resumption includes a suspension occurrence detection unit 601, a suspension information recording unit 602, a work travel management database 603, a suspension information extraction unit 604, a resumption information generation unit 605, a display data generation unit 606, a resumption position determination unit 607, and a resumption position editing unit 608. Next, functions of the work travel management module 60 will be described with reference to FIGS. 4 and 5. FIG. 4 is an illustrative diagram illustrating a work travel flow including suspension and resumption of the work travel as illustrated in FIG. 1. FIG. 5 is a screen transition diagram illustrating transition of a screen displayed by a display unit of the touch panel 40 when the suspended work travel is resumed.

The suspension occurrence detection unit 601 detects suspension of the work travel of the manual travel tractor on the basis of transition from automatic travel along the travel route to manual travel that leaves the travel route, an instruction to suspend the work travel, and the like. The suspension occurrence detection unit 601 then notifies occurrence of the work suspension to the suspension information recording unit 602. In response to the occurrence of the work suspension, the suspension information recording unit 602 generates suspension information (a halt record) indicating the suspension of the work travel, and then records the suspension information in the work travel management database 603. The suspension information includes information (a halt status) such as field information including a field ID in which the work is suspended, work travel information including details of the suspended work travel (such as a work type, work width, overlapping amount, vehicle speed, and engine speed), date and time when the work is suspended, work suspension position, which is the own position of point Px at which the work is suspended, and route section ID (one type of identification data) that indicates a travel route section (straight line route section) in which the work is suspended. The suspension information is recorded in the work travel management database 603 every time suspension of the work travel occurs.

The suspension information recorded in the work travel management database 603 is extracted by the suspension information extraction unit 604 using an arbitrary keyword, for example, suspension date and time, and the field. When the suspended work travel is resumed, an application program of the work travel management module 60 is executed in the field to resume the suspended work travel. At that time, a "resume" button b1 is displayed on a first screen displayed by the display unit of the touch panel 40 that serves as an information display unit (see #01 of FIG. 5). When this "resume" button b1 is clicked, a list of work travel suspended in the field is displayed on a time-series basis as suspension history information (see #02 of FIG. 5). At that time, the suspension information recorded in the work travel management database 603 is converted by the display data generation unit 606 into screen data for the display unit of the touch panel 40. When the tractor exists at a position other than in the field in which the work travel has been suspended, a list of work travel suspended in all fields is displayed.

Selecting corresponding suspension information from the list and clicking the selected suspension information causes details of the suspended work travel to be displayed as a suspended work details screen (see #03 of FIG. 5). In addition to the details of the suspended work travel, this suspended work details screen includes the field to resume the work travel, travel route set in this field, and work suspension position displayed as a symbol (black dot in FIG. 5).

When the work travel is actually resumed, clicking a "next" button b2 displayed on this screen causes a resumption point guidance screen to be displayed as resumption information as illustrated in FIG. 5 (see #04 of FIG. 5). This resumption point guidance screen is generated by the resumption information generation unit 605.

The resumption point guidance screen is used as resumption information for resuming the suspended work travel, and thus the resumption position determination unit 607 determines the work resumption position of the tractor through this screen. The default of the work resumption position is not the actual work suspension point but an end (starting end) of the straight line route section of the travel route that passes through the work suspension point. This is because the target travel route is detected more easily and transition to automatic travel is performed more smoothly at the end of the straight line route section than in the middle of the straight line route section. This default work resumption position is indicated with a display of a resumption position symbol mark (for example, a symbol design of the tractor) by clicking a "recommend" button b3 on the touch panel 40.

If a long period of time has elapsed from work suspension to work resumption, an effect of previous work has diminished and the work travel needs to be performed from the beginning. If the work travel has been performed by another tractor or the like, the work needs to be resumed from the suspension point of the work travel. Therefore, final determination of the work resumption position needs to be left to the user. The resumption position editing unit 608 is provided for this purpose, and the default work resumption position is changed through this resumption position editing unit 608. Editing work of the work resumption position is implemented by performing a drag and drop operation of the resumption position symbol mark displayed on the resumption point guidance screen of the touch panel 40. Edited data indicating an editing result performed by the resumption position editing unit 608 is provided to the resumption position determination unit 607.

The work resumption position finally determined by the resumption position determination unit 607 is provided to the work travel control unit 50 and the travel route setting unit 55. A travel control instruction and a work control instruction are output to the work travel control unit 50 on the basis of the own position from the own position calculation unit 54 and the target travel route from the travel route setting unit 55, and then the work travel is resumed.

OTHER EMBODIMENTS (1) In the above-described exemplary embodiment, the field data input unit 61, the travel route generation unit 62, and the work travel management module 60 have been configured in the general purpose terminal (first control unit) 4; however, these function units can be configured in the controlling unit 5 (executed by a CPU in the controlling unit 5), the control computer 100 (executed by a CPU in the control computer 100), or both of them. In addition, each function unit that constitutes the work travel management module 60 can be configured in the controlling unit 5 (executed by the CPU in the controlling unit 5), the control computer 100 (executed by the CPU in the control computer 100), or both of them. For example, the suspension information recording unit 602, the work travel management database 603, the suspension information extraction unit 604, and the resumption information generation unit 605 of the work travel management module 60 may be configured in the control computer 100 to implement the above-described work suspension and work resumption by data exchange between the general purpose terminal 4 and the control computer 100. Alternatively, this work travel management system may be implemented as a closed system (stand-alone) in the control system of the work vehicle, without performing data exchange with an external system such as the control computer 100.

(2) A configuration may be employed in which the suspension occurrence detection unit 601 detects work suspension on the basis of a work suspension instruction from a portable terminal of a supervisor who monitors automatic travel of the work vehicle.

(3) In the above-described exemplary embodiment, the travel route along which work travel is performed has substantially included the inside travel route including straight movement routes and U-turn routes that connect the straight movement routes, and the circumferential travel route for performing circumferential travel in the outer region of the field. Instead, a spiral travel route of traveling in the field spirally or other travel routes may be employed.

(4) While the tractor equipped with the tilling machine has been described as the work vehicle in the above-described exemplary embodiment, the embodiment of the present invention is applicable to a tractor equipped with the work device 30 other than the tilling machine, and further to work travel management of agricultural work vehicles, such as combines and rice transplanters, and construction machinery.

INDUSTRIAL APPLICABILITY

The embodiment of the present invention is applicable to management of the work travel of the work vehicle capable of traveling automatically along the travel route.

A work travel management system for managing work travel of a work vehicle capable of automatically traveling along a travel route in a work field according to the embodiment of the present invention includes: a suspension information recording unit that records suspension of the work travel performed by the work vehicle as suspension information; a suspension information extraction unit that extracts the suspension information from the suspension information recording unit; an information display unit that displays the extracted suspension information; a resumption information generation unit that generates resumption information for resuming the suspended work travel based on the suspension information and causes the suspension information to display the generated resumption information; and a work travel control unit that performs the work travel of the work vehicle based on the resumption information.

With this configuration, when the work travel is suspended, the suspension information is recorded, which is information regarding the suspended work travel. When the suspended work travel is resumed, the recorded suspension information is displayed by a display or the like, and thus a user can determine work travel to resume from the displayed suspension information. When the work travel to resume is determined, information regarding the work travel is displayed as the resumption information, and thus the user can check the information regarding resumption of the work travel. Accordingly, resumption of the work travel the user desires can be set and performed easily.

According to one advantageous exemplary embodiment of the present invention, the suspension information is displayed by the information display unit on a time-series basis from latest suspension information as suspension history information. With this configuration, when there is a plurality of pieces of suspended work travel, display is made from the latest work travel, thereby facilitating selection of the work travel to resume.

In order to resume the suspended work travel, details of the work travel that has been performed before the suspension and a position where the work travel is suspended, that is, a position where the work travel should be resumed are important. In particular, when the details of the work travel include description that identifies the work field, selecting a wrong position and overlooking of a position where the work travel needs to be resumed are avoided. Furthermore, when the details of the work travel include work parameters that prescribe the work travel (such as work width and work speed), setting wrong work parameters is avoided. Therefore, according to one advantageous exemplary embodiment of the present invention, the suspension information includes details of the suspended work travel and a position of the work vehicle at the time of suspension.

Since this work vehicle travels automatically along the travel route generated for the work field, if the travel route used in previous work can be used again when the work travel is resumed, it is advantageously not necessary to newly generate the travel route. Furthermore, when work travel that connects long straight line travel with U-turn travel is used, which is often used for field work, if a straight line route section in which the work travel has been suspended is known out of a straight line route section used for straight travel, the work travel is resumed smoothly. Therefore, according to one advantageous exemplary embodiment of the present invention, the travel route includes a plurality of straight line route sections and a U-turn route section connecting ends of the straight line route sections, and the suspension information includes the travel route and identification data of each of the straight line route sections in which the work vehicle travels at the time of suspension.

It is not necessarily optimum to resume the work travel at a position where the work travel has been suspended. There is also a request that, when the work suspension position is at the center of the work field, instead of moving the work vehicle to such a work suspension position and then resuming the work travel, the work travel should be resumed at a position the work vehicle can easily approach from a current position of the work vehicle as a starting point. It is important that basically the user determines where to resume the work travel in consideration of the work suspension position. Therefore, according to one advantageous exemplary embodiment of the present invention, the resumption information includes a work suspension position, and the work suspension position in the work field is displayed as a symbol when the resumption information is displayed by the information display unit. This display allows the user to easily grasp the position to resume the work travel.

It is sometimes difficult for a user inexperienced in the work travel along the travel route or a user unacquainted with geographical features of the work field to determine an appropriate position to resume the work travel. Therefore, according to one advantageous exemplary embodiment of the present invention, a resumption position determination unit is further provided that determines a work resumption position where the work vehicle resumes the work travel, and the work resumption position in the work field is displayed as a symbol when the resumption information is displayed by the information display unit. When the work resumption position displayed as a symbol is approved by the user, the work travel control unit resumes the work travel from the position. In consideration of a case where the work resumption position displayed as a symbol is not approved by the user, a resumption position editing unit that changes the work resumption position is preferably provided.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle management system comprising:
    a memory to store at least one halt record with respect to a halt status at a timing when a work vehicle is halted while traveling along a travel route in a work field;
    first circuitry configured to record the at least one halt record in the memory;
    second circuitry configured to extract the at least one halt record from the memory to display in a display the at least one halt record from which a resuming basis record is to be selected;
    third circuitry configured to generate resuming information based on the resuming basis record; and
    fourth circuitry configured to control the work vehicle based on the resuming information to resume from the halt status.

2. The work vehicle management system according to claim 1, wherein the at least one halt record is displayed in the display on a time-series basis from a latest suspension record.

3. The work vehicle management system according to claim 1, wherein the halt status includes at least one of a work status, a status of the work vehicle, and a position of the work vehicle at the timing when the work vehicle is halted.

4. The work vehicle management system according to claim 1,
    wherein the travel route includes straight line route sections and at least one U-turn route section connecting ends of the straight line route sections, and
    wherein the halt status includes a first identification data by which the travel route is identified and a second identification data by which the straight line route section in which the work vehicle travels at the time of suspension is identified.

5. The work vehicle management system according to claim 1, further comprising:
    fifth circuitry configured to display the resuming information in the display.

6. The work vehicle management system according to claim 5,
    wherein the resuming information includes a work halt position where the work vehicle is positioned at the timing when the work vehicle is halted, and
    wherein the work halt position in the work field is displayed as a symbol when the resuming information is displayed in the display.

7. The work vehicle management system according to claim 6,
    wherein the third circuitry is configured to determine a work resuming position where the work vehicle is positioned to resume from the halt status, and
    wherein the work resuming position in the work field is displayed as a symbol when the resuming information is displayed in the display.

8. The work vehicle management system according to claim 7, wherein the third circuitry is configured to change the work resuming position.

9. The work vehicle management system according to claim 1, wherein the work vehicle is to travel automatically along the travel route.

10. The work management system according to claim 1, wherein the memory, the first circuitry, the second circuitry, the third circuitry, and the fourth circuitry are provided in a single terminal.

11. A work vehicle management method comprising:
    recording in a memory at least one halt with respect to a halt status at a timing when a work vehicle is halted while traveling along a travel route in a work field;
    extracting the at least one halt record from the memory to display in a display the at least one halt record from which a resuming basis record is to be selected;
    generating resuming information based on the resuming basis record; and
    controlling the work vehicle based on the resuming information to resume from the halt status.

12. A work vehicle management system comprising:
    a memory to store at least one halt record with respect to a halt status at a timing when a work vehicle is halted while traveling along a travel route in a work field;
    recording means for recording the at least one halt record in the memory;
    extracting means for extracting the at least one halt record from the memory to display in a display the at least one suspension record from which a resuming basis record is to be selected;
    generating means for generating resuming information based on the resuming basis record; and
    controlling means for controlling the work vehicle based on the resuming information to resume from the halt status.

* * * * *